United States Patent [19]

Macdonald et al.

[11] Patent Number: 5,602,932

[45] Date of Patent: Feb. 11, 1997

[54] PHOTODETECTOR ARRAY BASED IMAGE ANALYSIS APPARATUS

[75] Inventors: Alan Macdonald, Glasgow; Ian Miller, Lochwinnoch, both of Scotland

[73] Assignee: International Business Machines Corporation, Armonk, N.Y.

[21] Appl. No.: 499,712

[22] Filed: Jul. 7, 1995

Related U.S. Application Data

[63] Continuation of Ser. No. 206,294, Mar. 4, 1994, abandoned.

[51] Int. Cl.⁶ ........................................... G06K 9/00
[52] U.S. Cl. .................................. 382/100; 348/189
[58] Field of Search .......................... 348/138, 282, 348/189

[56] References Cited

U.S. PATENT DOCUMENTS

| | | | |
|---|---|---|---|
| 4,480,264 | 10/1984 | Duschl | 348/189 |
| 4,642,529 | 2/1987 | Penn | 348/189 |
| 4,654,706 | 3/1987 | Davidson et al. | 358/139 |
| 4,684,982 | 8/1987 | Krufka | 348/138 |
| 5,027,195 | 6/1991 | Cooley et al. | 348/283 |
| 5,049,791 | 9/1991 | Kawakami | 348/191 |
| 5,175,772 | 12/1992 | Kahn et al. | 382/1 |
| 5,216,504 | 6/1993 | Webb et al. | 348/190 |
| 5,282,043 | 1/1994 | Cochard et al. | 348/282 |
| 5,315,310 | 5/1994 | Eagle et al. | 345/14 |
| 5,334,911 | 8/1994 | Emmoto | 348/189 |
| 5,340,977 | 8/1994 | Kojima et al. | 348/283 |
| 5,369,432 | 11/1994 | Kennedy | 348/189 |

FOREIGN PATENT DOCUMENTS

| | | | |
|---|---|---|---|
| 0442685 | 8/1991 | European Pat. Off. | H04N 17/40 |
| 0562973 | 9/1993 | European Pat. Off. | H04N 17/40 |

*Primary Examiner*—Michael T. Razavi
*Assistant Examiner*—Jayanti K. Patel
*Attorney, Agent, or Firm*—Kevin M. Jordan

[57] ABSTRACT

Image analysis apparatus comprises a two dimensional array of photodetectors (80) for receiving light from pixels of a display screen (90). The intensity values generated by the photodetectors (80) in response to incident light from the pixels are stored in a memory (40). The photodetectors' spatial geometry is mapped onto the display screen's known pixel geometry. A processor (50) determines one or more performance parameters of the display screen (90) as a function of the intensity values stored in the memory (40) and of the photodetectors mapped spatial geometry (80). Calibration and correlation problems associated with prior art measurement techniques are avoided by mapping the spacing of the array of photodetectors onto the known geometry of the display pixel structure. Also, the apparatus can be conveniently incorporated into a handset and therefore does not require complicated positioning jigs in use.

25 Claims, 9 Drawing Sheets

PHOTODETECTOR ARRAY BASED IMAGE ANALYSIS APPARATUS

This is a continuation of application Ser. No. 08/206,294, filed Mar. 4, 1994, now abandoned.

BACKGROUND OF THE INVENTION a. Field of the Invention

The present invention relates to image analysis apparatus for measuring the front of screen performance of a display device.

b. Related Art

An example of conventional image analysis apparatus for measuring front of screen performance comprises an array of fixed cameras. Each camera is equipped with its own lens. Calibration data varies from one camera to another as a function of the tolerance of the constituent components and of the position of the cameras relative to the target. Calibration is generally performed by placing a calibration target carrying a test image in place of the normal target. A computer system under the control of computer software then analyses the detected test images to determine the spatial calibration data for each camera/lens combination.

Another example of conventional image analysis apparatus for measuring front of screen performance comprises a camera which is moveable relative to the target to select different areas of the target. Yet another example of such apparatus comprises a moveable lens system for selectively directing different portions of the target towards a fixed camera. In both cases, the spatial calibration is again performed by placing a calibration target carrying a test image in place of the normal target, and analysing the detected test image to determine the calibration data for the camera.

Conventional image analysis tools, such as those described above, are too large for use as hand-held instruments. The user cannot therefore select different areas of the target for analysis without the use of complex and relatively slow positioning jigs.

In accordance with the present invention, there is now provided image analysis apparatus comprising: a two dimensional array of photodetectors having a known spatial geometry for receiving light from pixels of a display screen having a known pixel geometry; a memory for storing intensity values generated by the photodetectors in response to incident light from the pixels; means for mapping the phhotodetectors' spatial geometry onto the display screen's pixel geomtry; and a processor adapted to determine a performance parameter of the display screen as a function of the intensity values stored in the memory and of the photodetectors' mapped spatial geometry.

SUMMARY OF THE INVENTION

Conventional calibration and correlation problems are avoided in accordance with the present invention by mapping the spatial geometry of the array of photodetectors onto the known pixel geometry of the display prior to measurement. Furthermore, because the apparatus of the present invention can be conveniently incorporated into a portable handset, complicated positioning jigs are not required. The apparatus can thus be used with ease by relatively unskilled personnel. The present invention thus provides fast, low cost, high resolution measurement of front of screen parameter suitable for use in high volume manufacturing environments.

The processor is preferably adapted to determine one or more of the following performance parameters of the display a) the inner character contrast ratio of characters displayed by the display;

b) the line width generated by the display;

c) the spot size generated by the display;

d) the spot shape produced by the display;

e) the spot profile produced by the display; and, f) the beam convergence of the display.

The array of photodetectors are preferably in the form of a charge-coupled device package that can be conveniently accommodated in a handset along with the processor and the memory. It will hence be appreciated that the present invention extends to a portable instrument hand-set comprising image analysis apparatus as described in the preceding paragraph.

BRIEF DESCRIPTION OF THE DRAWINGS

A preferred embodiment of the present invention will now be described, by way of example only, with reference to the accompanying drawings, in which.

DETAILED DESCRIPTION OF THE PREFERRED EMBODIMENT

Figure 1:
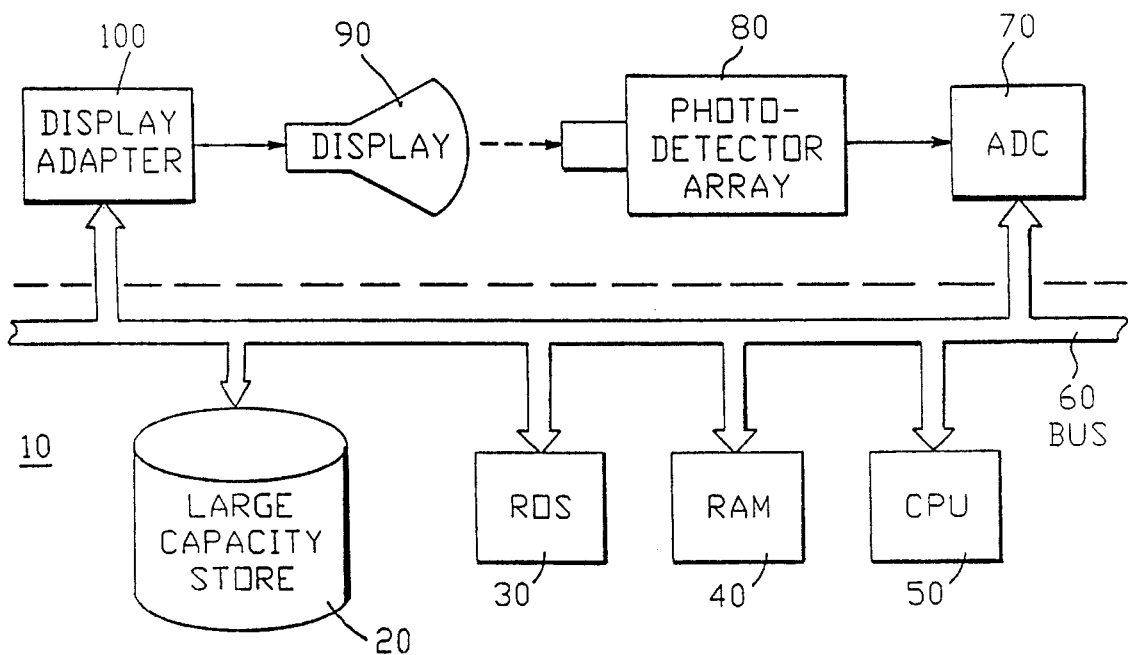
FIG. 1 is a block diagram of image analysis apparatus of the present invention.

Referring first to FIG. 1, an example of image analysis apparatus of the present invention comprises a data processor 10 such as a personal computer. The data processor 10 comprises a central processing unit (CPU) 50, random access memory (RAM) 40, read only storage (ROS) 30, and large capacity store 20, such as a tape streamer or hard disk drive for example, all interconnected by bus architecture 60. Bus architecture 60 is connected to a colour display under test 90 via a display adaptor 100. It will however be appreciated from the following that the present invention can also be used to analyse the performance of monochrome displays. A monochrome charge-coupled device (CCD) array 80 is connected, via an analogue to digital convertor (ADC) 70, to the bus architecture 60 of the data processor 110. CCD array 80 is in the form of a handset connected to ADC 70 via a flexible cable. The flexible cable allows CCD array to be held in position against the screen of the display under test 90 by hand.

Figure 2:
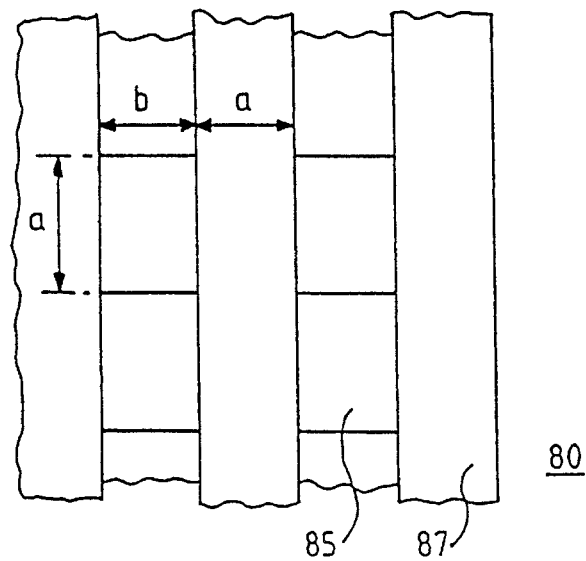
FIG. 2 is a simplified view of a CCD array for image analysis apparatus of the present invention.

Referring now to FIG. 2, CCD array 80 comprises a two dimensional array of photosensitive elements 85 formed on the surface of a silicon substrate. The elements 85 are arranged in columns spaced from each other by opaque aluminium register shields 87. Each element 85 has an area of 12 um×18 um. In operation, a packet of electrical charge is accumulated at each element as a function of incident light intensity and exposure time. By application of control signals, each packet of charge can be shifted out of the array and converted into a voltage. The serial data stream produced by shifting out the charge packets is clocked into ADC 70 to generate a digital representation of the image incident on array 80.

Figure 3:
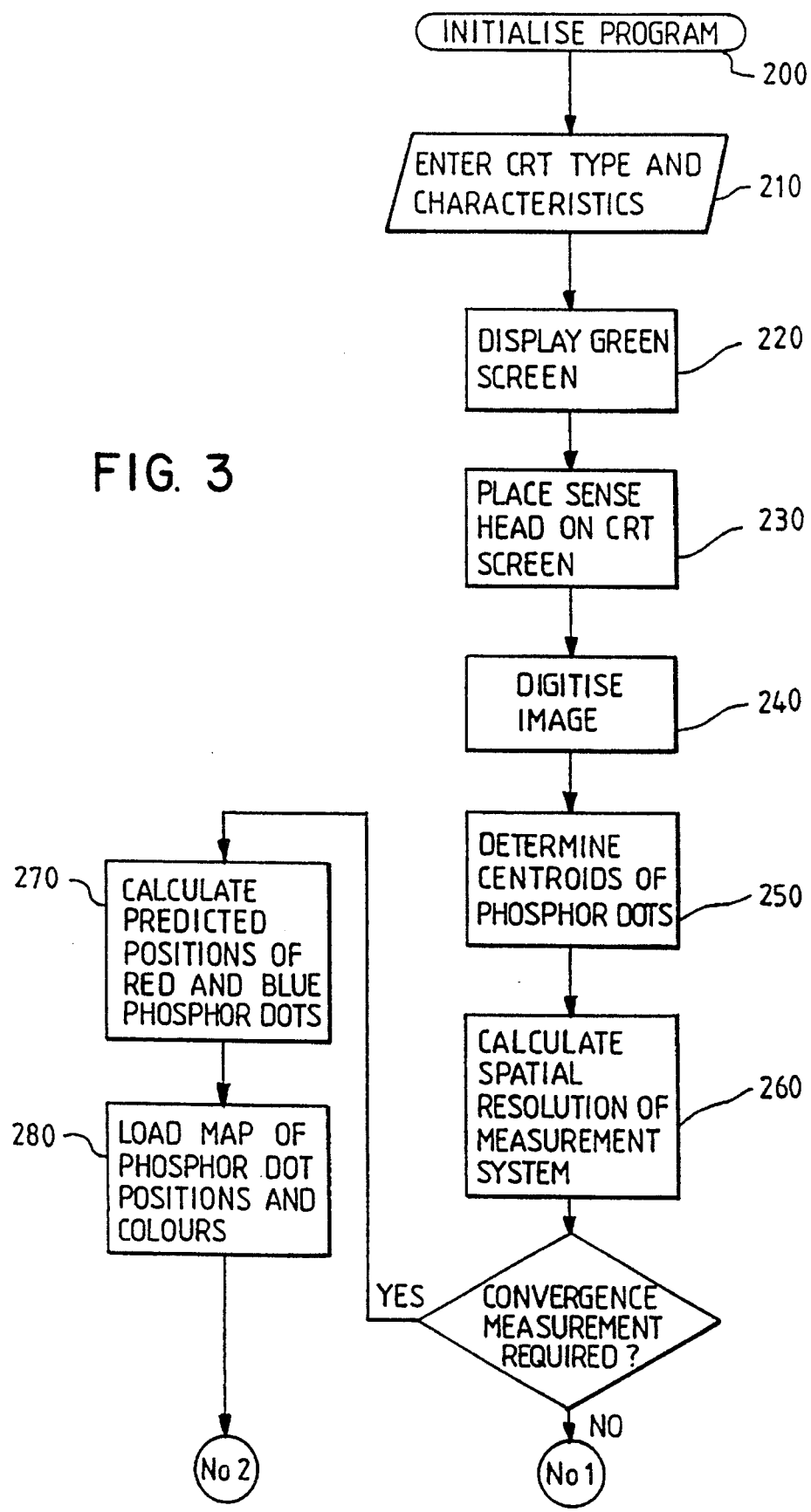
FIG. 3 is a flow chart illustrating a method of calibrating the image analysis apparatus of the present invention.

One way of calibrating the apparatus according to the present invention will now be described with reference to FIG. 3. At step 200, CPU 50, under the control of computer program code stored in RAM 40 and ROS 30, requests type information identifying display 90. At step 210, the information may be manually entered by the operator via a keyboard or keypad (not shown) for example. Alternatively, at step 20, the type information may be obtained automatically from, for example, a bar code fixed to display 90. Central processing unit 50 uses the type information to retrieve display specifications corresponding to display 90 from a data base pre-stored in large capacity store 20.

Figure 4:
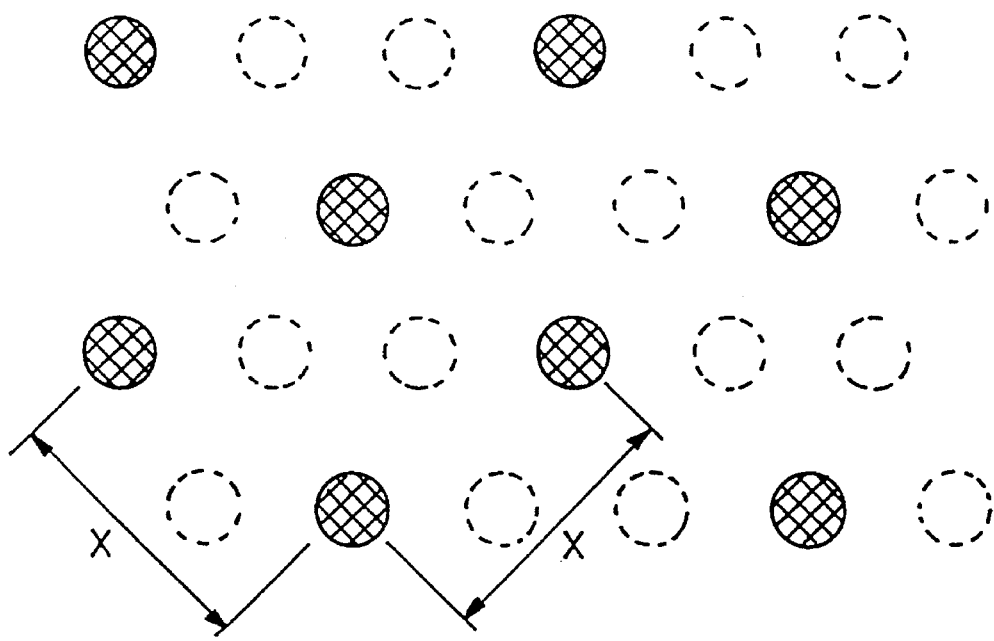
FIG. 4 is a plan view of a CRT display screen.

Referring to FIG. 4, the display specifications include the geometry and pitch of the perforations in the shadowmask of the CRT in display under test 90. The geometry and pitch of the perforations define the distance X between any one of the pixels, Red, Green or Blue, on the screen and its nearest neighbour of the same colour.

Referring back to FIG. 3, at step 220, CPU 50 configures display adaptor 100 to generate video signals for producing a test pattern in the form of a green block on the screen of display 90 as a function of the received display specifications. At step 230, CCD array is placed against the screen to detect the test pattern. At step 230, the test pattern is detected by CCD array 80. At step 240, the output of CCD array 80 is digitised by ADC 70. CPU 50 reads the output of ADC 70 into RAM 40 via bus architecture 60.

By analysing the output data thus stored in RAM 40 at step 250, CPU 50 determines which of the elements 85 of CCD array 80 correspond to the centroids of adjacent illuminated pixels along a pixel row of the display screen. At step 260, CPU 50 calculates geometrically the actual distance between the illuminated pixels from the shadowmask type and pitch in the display specification. By dividing the actual distance by the number of CCD elements along a row of the array between those corresponding to the adjacent illuminated pixels, CPU 50 can calibrate the apparatus for measuring distances in terms of CCD elements. It will be appreciated that in other embodiments of the present invention, the apparatus may be calibrated in this manner from a test image including either a red block or a blue block.

If convergence measurements are required, at step 270, CPU 50 predicts, in terms of CCD elements, the positions of the red and blue pixels as a function of the shadowmask type and pitch and the detected positions of the green pixels. CPU 50 stores the resulting map of pixel positions and colours into RAM. The calibration routine then terminates at #2. If convergence measurements are not required, the calibration routine terminates at #1.

Figure 5:
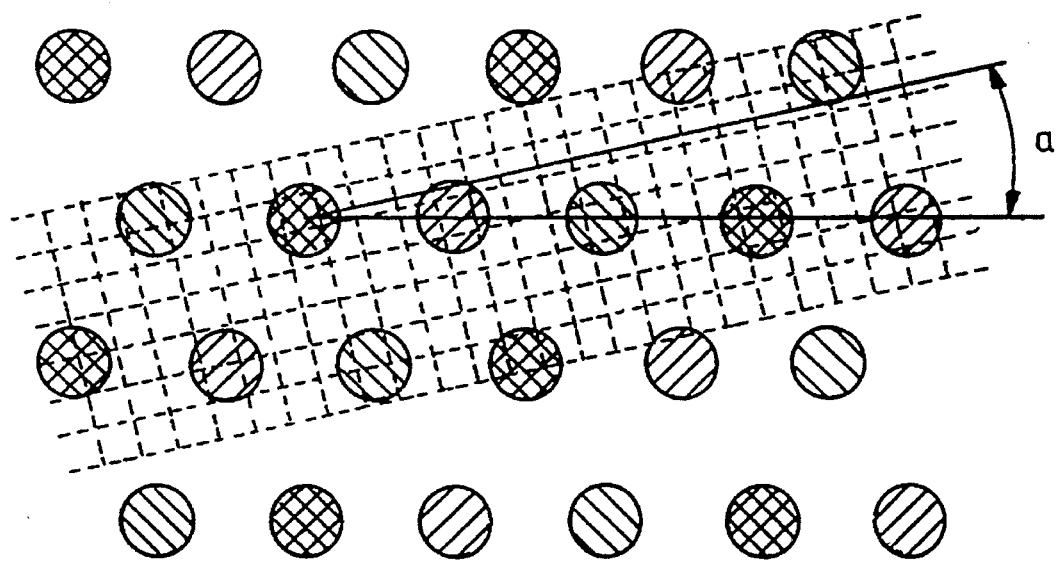
FIG. 5 is a plan view of a CRT display screen overlayed with the CCD array.

Referring to FIG. 5, if there is no rotational error between CCD array 80 and the screen, the centroids of each row of pixels correspond to a row of elements of the CCD array 80. However, if CCD array 80 is skewed relative to the screen, the centroids of one row of pixels correspond to elements of different rows of CCD array 80. For small angles a (typically less than 10 degrees) of skew, the error can be corrected by CPU 50 from the known dimensions of CCD array 80. If the angle of skew is too large for correction, CPU 50 instructs the operator to rotate the array to reduce the error.

Figure 6:
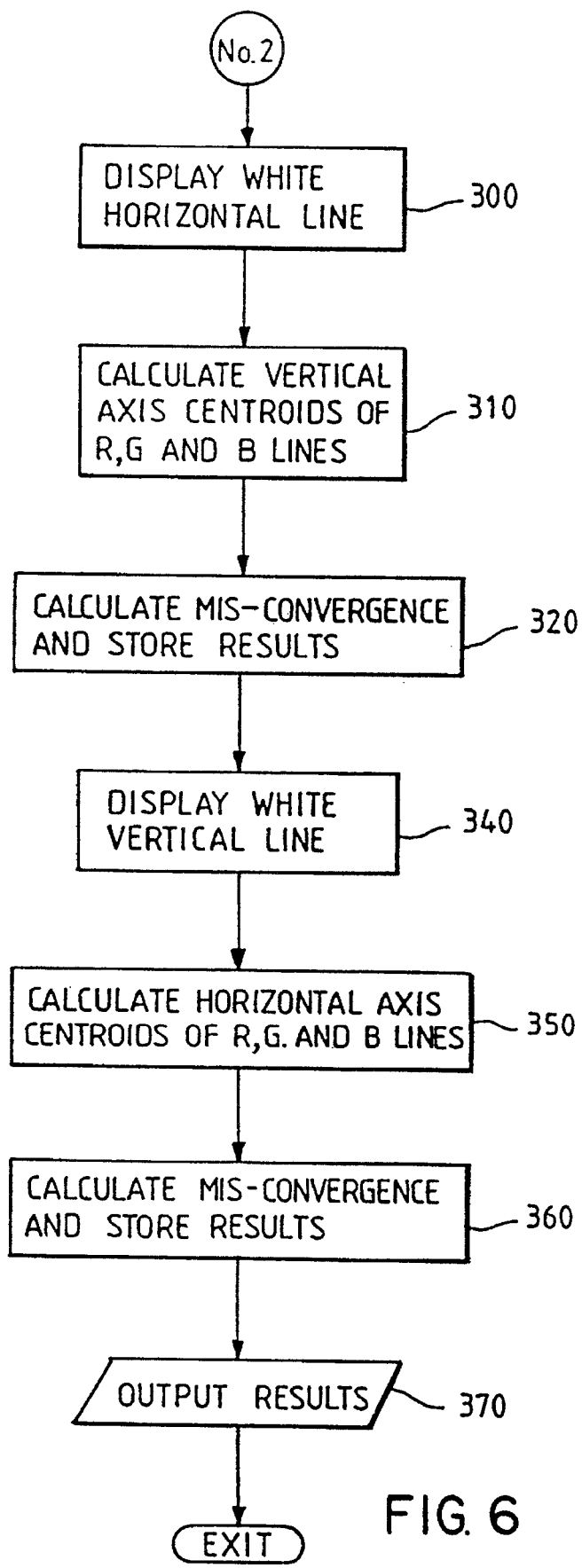
FIG. 6 is a flow chart illustrating convergence measurement in accordance with the present invention.

Referring now to FIG. 6, to measure the convergence of the display under test 90, at step 300, CPU 50 configures display adaptor 100 to generate video signals for generating a test pattern in the form of a white horizontal line on the screen of display under test 90. As before during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 310, CPU 50 determines the vertical axis centroids of the Red, Green and Blue components of the detected horizontal line. At step 320, CPU 50 compares the vertical axis centroids determined at step 310 with the pixel map stored in RAM 40 and stores the differences in RAM 40. The differences indicate the vertical misconvergence of display under test 90.

At step 340, CPU 50 configures display adaptor 100 to generate video signals for generating a test pattern in the form of a white vertical line on the screen of display under test 90. Again, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 350, CPU 50 determines the horizontal axis centroids of the Red, Green and Blue components of the detected horizontal line. At step 360, CPU 50 compares the horizontal axis centroids determined at step 310 with the pixel map stored in RAM 40 and stores the differences in RAM 40. The differences indicate the horizontal mis-convergence of display under test 90. The vertical and horizontal misconvergences are displayed at step 370.

Figure 7:
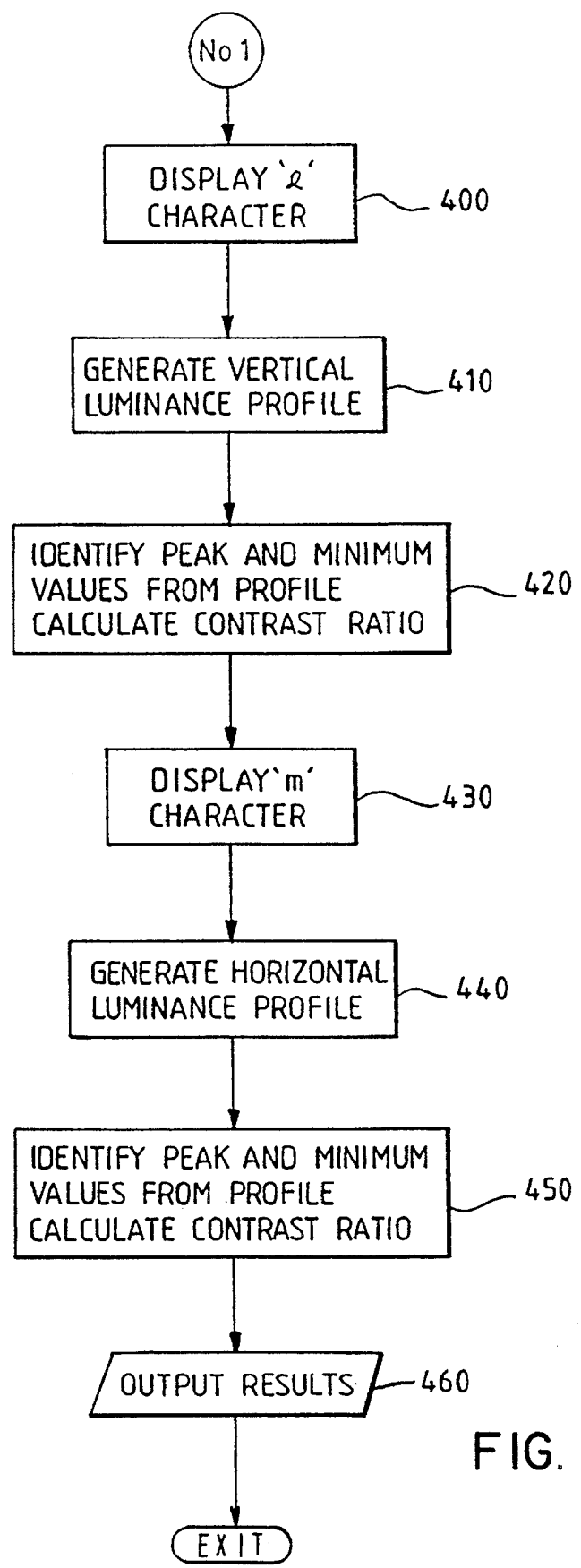
FIG. 7 is a flow chart illustrating inner character contrast ratio measurement in accordance with the present invention.

Referring now to FIG. 7, to measure the vertical inner character contrast ratio of the display under test, at step 400, CPU 50 configures display adaptor 100 to generate video signals for generating a test pattern in the form of the character "e" in white on the screen of display under test 90. As before during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 410, CPU 50 determines the vertical luminence profile of the detected character as a function of the digitised output from ADC 70 stored in RAM 40. At step 420, CPU 50 calculates the vertical contrast ratio from the maximum and minimum values in the vertical luminence profile.

To measure the horizontal inner character contrast ratio, at step 430, CPU 50 configures display adaptor 100 to generate video signals for generating a test pattern in the form of the character "m" in white on the screen of display under test 90. Again, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 440, CPU 50 determines the horizontal luminence profile of the detected character as a function of the digitised output from ADC 70 stored in RAM 40. At step 450, CPU 50 calculates the horizontal contrast ratio from the maximum and minimum values in the horizontal luminence profile. The vertical and horizontal inner character contrast ratios are displayed at step 370.

It will be appreciated that, if display under test 90 were replaced by a monochrome display, the vertical and horizontal inner character contrast ratios can be measured in accordance with the present invention from the same characters, "m" and "e" displayed in the colour of the screen phosphor. It will also be appreciated that, the above-mentioned vertical and horizontal inner character contrast ratio measurements can be repeated at different points on the screen to produce averaged values. It will further be appreciated that, in other embodiment of the present invention, characters with strokes similar to "m" and "e" may be used to effect the above-mentioned measurements.

Figure 8:
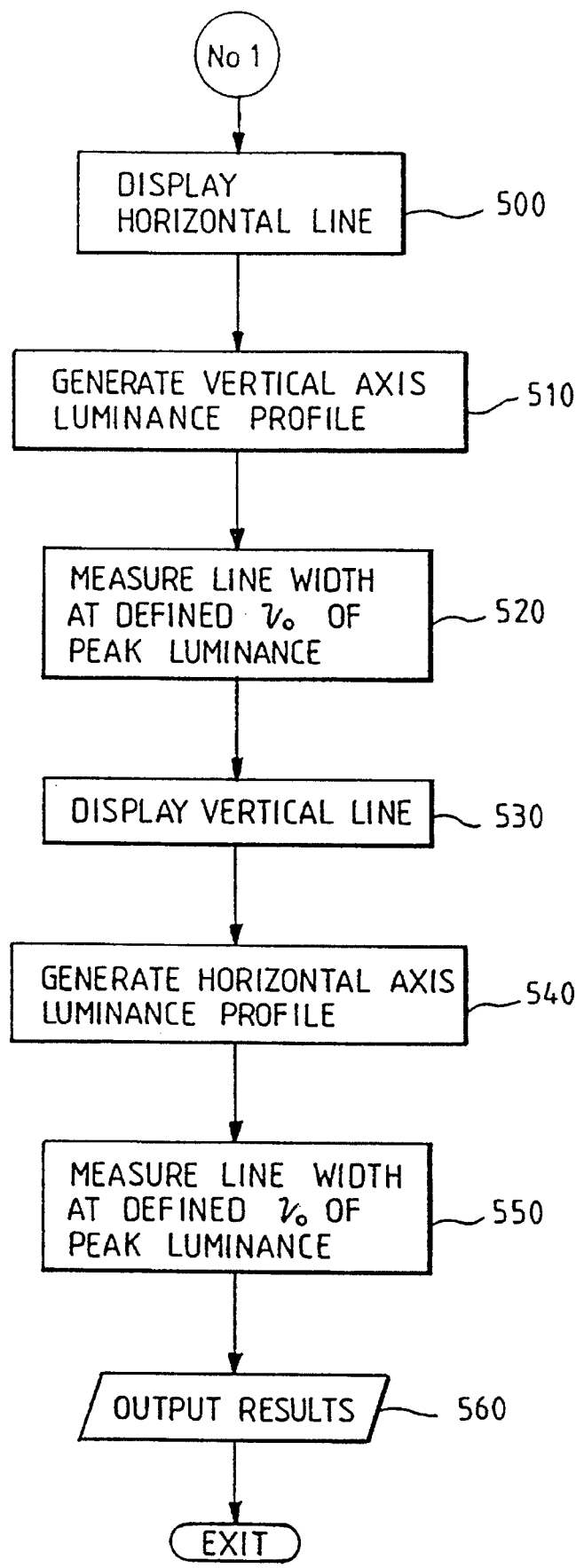
FIG. 8 is a flow chart illustrating line width measurement in accordance with the present invention.

Referring to FIG. 8, to measure the vertical and horizontal line width of the display under test, at step 500, CPU 50 configures display adaptor 100 to generate video signals for generating a test pattern in the form of a horizontal line in white on the screen of display under test 90. As during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 510, CPU 50 determines the vertical luminence profile of the detected line as a function of the digitised output from ADC 70 stored in RAM 40. At step 520, CPU 50 determines, from the vertical luminence profile, the horizontal line width in terms of CCD elements at a predefined percentage of the peak luminence.

At step 530, CPU 50 configures display adaptor 100 to generate video signals for generating a test pattern in the form of a vertical line in white on the screen of display under test 90. As during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 540, CPU 50 determines the horizontal luminence profile of the detected line as a function of the digitised output from ADC 70 stored in RAM 40. At step 550, CPU 50 determines, from the horizontal luminence profile, the vertical line width in terms of CCD elements at a predefined percentage of the peak luminence. At step 370, CPU 50 converts the vertical and horizontal line width measurements from CCD elements into appropriate metric units for display to the operator.

Figure 9:
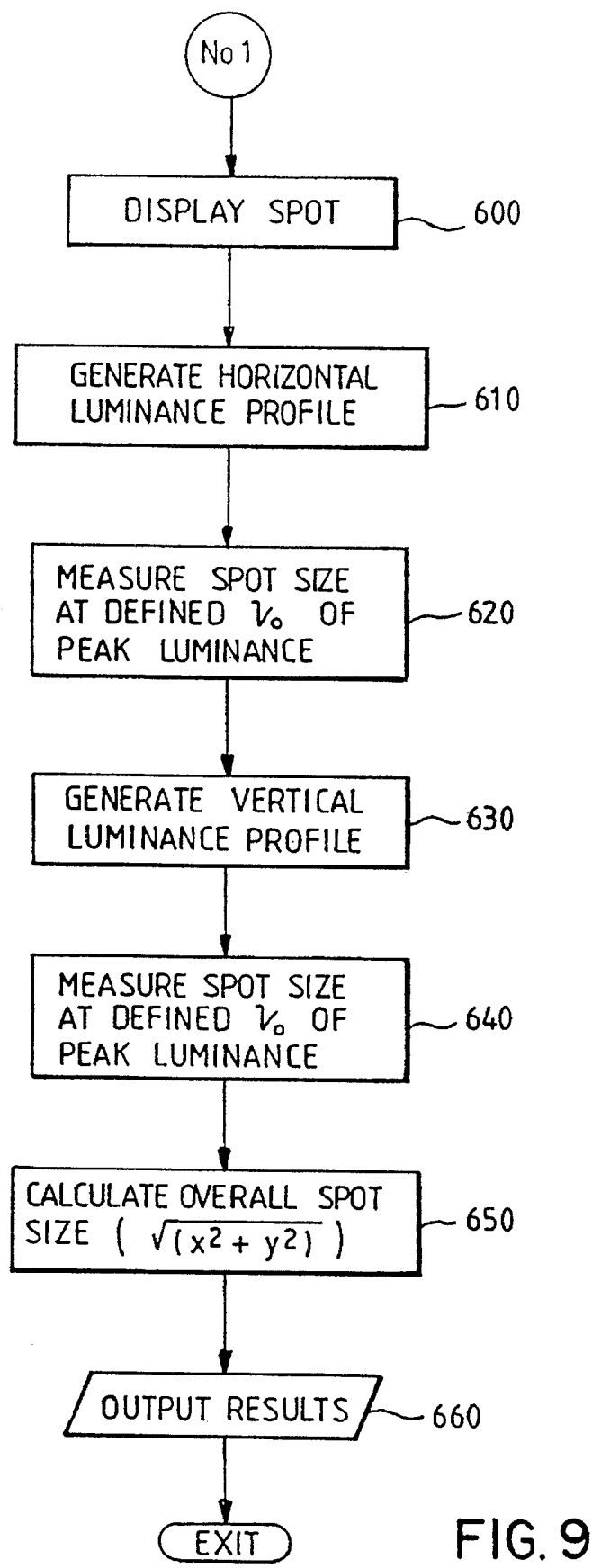
FIG. 9 is a flow chart illustrating spot size measurement in accordance with the present invention.

Referring now to FIG. 9, to measure the spot size of the display under test 90, at step 600, CPU 50 configures display adaptor 100 to generate video signals for generating a test pattern in the form of a white spot on the screen of display under test 90. As during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 610, CPU 50 determines the horizontal luminence profile of the detected spot as a function of the digitised output from ADC 70 stored in RAM 40. At step 620, CPU 50 determines from the horizontal luminence profile the spot width X in terms of CCD elements at a predefined percentage of the peak luminence. At step 630, CPU 50 determines the vertical luminence profile of the detected spot as a function of the digitised output from ADC 70 stored in RAM 40. At step 640, CPU 50 determines, from the vertical luminence profile, the spot height Y in terms of CCD elements at a predefined percentage of the peak luminence. At step 650, CPU 50 calculates the overall spot size by applying Pythagoras theorem to X and Y. At step 660, CPU 50 converts the calculated overall spot size from CCD elements into appropriate metric units for display to the operator.

Figure 10:
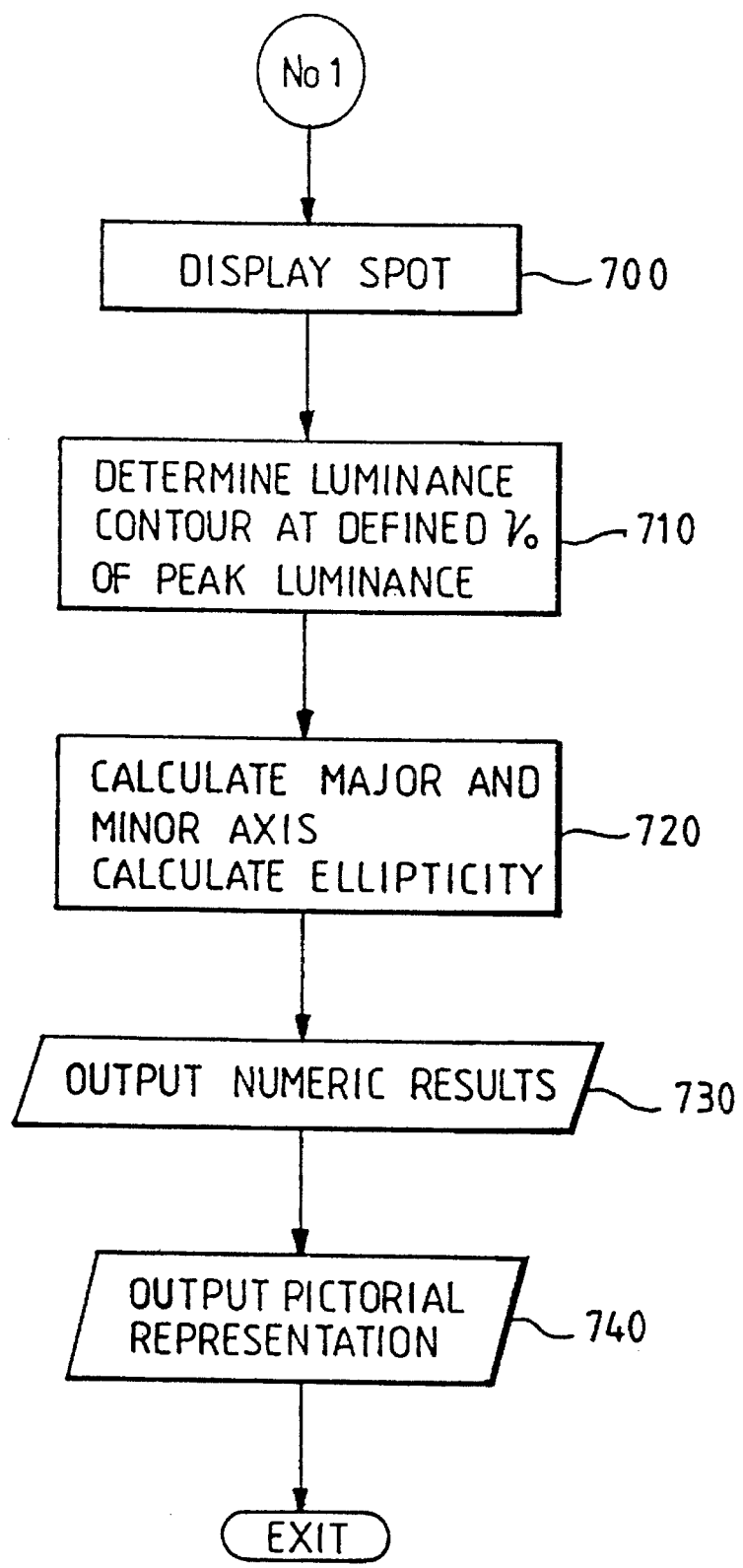
FIG. 10 is a flow chart illustrating spot shape determination in accordance with the present invention.

Referring now to FIG. 10, to measure the spot shape of display under test 90, at step 700, CPU 50 configures display adaptor 100 to generate video signals for generating a test pattern in the form of a white spot on the screen of display under test 90. As during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 710, CPU 50 determines from the digitised output of ADC 70 stored in RAM 40, a luminence contour of the detected spot in terms of CCD elements at a predefined percentage of the peak luminence. At step 720, CPU 50 determines the major and minor axes of the luminence contour and calculates the ellipticity of the luminence contour as a function of the major and minor axes. At step 730, CPU 50 converts the calculated numerical values from CCD elements into appropriate metric units for display to the operator. At step 740, CPU 50 compiles a pictorial representation of the spot for display to the operator.

Figure 11:
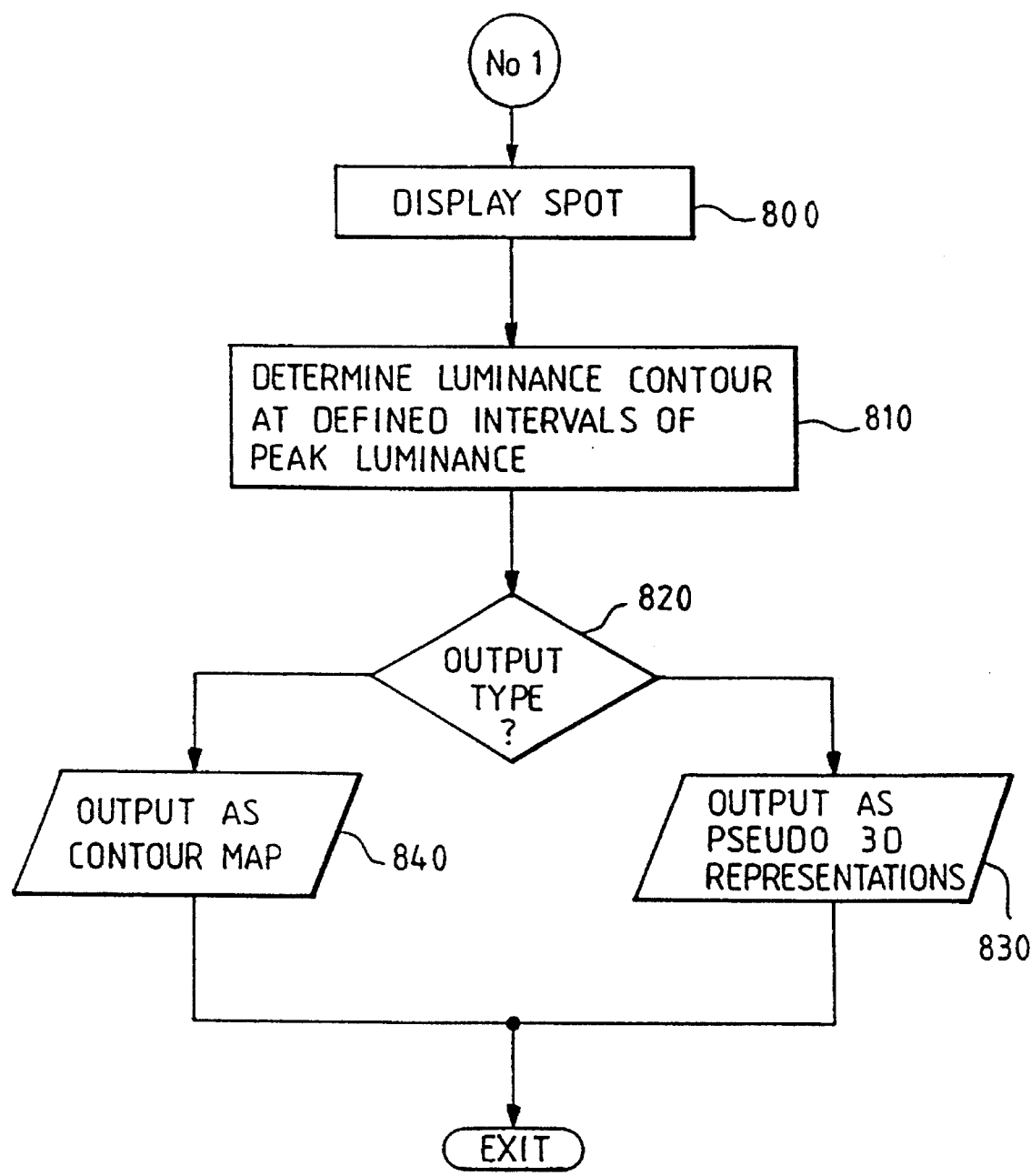
FIG. 11 is a flow chart illustrating spot profile measurement in accordance with the present invention.

Referring now to FIG. 11, to measure the spot profile of display under test 90, at step 800, CPU 50 configures display adaptor 100 to generate video signals for generating a test pattern in the form of a white spot on the screen of display under test 90. As during calibration, CCD array 80 is placed against the screen to detect the test pattern, the test pattern is detected by CCD array 80, the output of CCD array 80 is digitised by ADC 70, and CPU 50 reads the output of ADC 70 into RAM 40 via bus architecture 60. At step 810, CPU 50 determines from the digitised output of ADC 70 stored in RAM 40, a luminence contour of the detected spot in terms of CCD elements at a predefined percentage of the peak luminence. Depending on a selection made by the operator at step 820, CPU 50 either, at step 840, generates a representation of the spot profile in the form of a contour map as a function of the luminence contour for display to the operator, or, at step 830, generates a pseudo three dimensional representation of the spot profile as function of the luminence contour for display to the operator.

In the preferred embodiment of the present invention hereinbefore described CPU 50, RAM 40, and ROS 30 are part of a data processor such as a personal computer and are connected to the CCD array handset 80 via a flexible communication cable. However, in other embodiments of the present invention, CCD array handset 80 is in the form of a remote device incorporating CPU 50, RAM 40 and ROS 30. In such embodiments of the present invention, the remote device is provided with a port for connection to a host data processor to permit display specifications to be loaded as required into RAM 40 from a database stored in a large capacity store of the host data processor. The remote device is provided with a keypad to permit the operator to select measurement functions and a display panel for displaying resulting measurements.

We claim:

1. A photodetector array based image analysis apparatus comprising:

a two dimensional array of photodetectors having a known spatial geometry for receiving light from pixels of a display screen having a known pixel geometry and pitch;

a memory for storing the known pixel geometry and pitch of the display screen, the known spatial geometry of the photodetectors, and intensity values generated by the photodetectors in response to incident light from the pixels;

apparatus calibration means for measuring distances in terms of the stored spatial geometry as a function of the stored pixel geometry and pitch, and the stored intensity values; and, a processor for determining a performance parameter of the display screen as a function of the intensity values stored in the memory and a calibrated spatial geometry of the apparatus, responsive to said apparatus calibration means wherein said apparatus calibration means comprises:
the photodetectors detecting one of a red, green, or blue color test pattern generated by the display screen:
an analog-to-digital converter coupled to the photodetectors for digitizing the intensity values associated with the color test pattern:
the processor adapted for storing digitized intensity values in the memory and determining a row of centroid photodetectors which correspond to centfolds of adjacent illuminated pixels along a pixel row of the display screen, and determining an actual distance between the illuminated pixels from the stored pixel geometry:
the processor being further adapted for calibrating the apparatus for measuring distances in terms of the photodetectors' stored spatial geometry as a function of the actual distance and a number of photodetectors between two centroid photodetectors.

2. The apparatus of claim 1 wherein the display screen is a color display screen, said apparatus calibration means further comprising:
the processor adapted for predicting the positions of pixels not generated by the test pattern of the color display screen, in terms of the photodetectors' spatial geometry, as a function of the stored pixel geometry and pitch and the stored intensity values; and, wherein the memory comprises means for storing a map of pixel positions and colors including predicted positions of pixels.

3. The apparatus of claim 2, wherein the processor comprises: means for determining the performance parameter of the display screen as a function of the photodetectors' mapped spatial geometry.

4. The apparatus of claim 3, wherein the performance parameter is convergence of a color display screen comprising:
the processor being adapted for measuring and storing a vertical convergence by comparing vertical axis centroids of each color component of the test pattern which is in a form of a white horizontal line with the map of the predicted positions of the pixels; and
the processor being further adapted for measuring and storing a horizontal convergence by comparing horizontal axis centroids of each color component of the test pattern which is in a form of a white vertical line with the map of the predicted positions of the pixels.

5. The apparatus of claim 1, wherein the performance parameter is an inner contrast ratio of characters displayed by the display screen and wherein the processor comprises: means for determining a horizontal and a vertical luminance profile from the intensity values; means for determining the vertical contrast ratio as a function of the vertical luminance profile; and means for determining the horizontal contrast ratio as a function of the horizontal luminance profile.

6. The apparatus of claim 1, wherein the array of photodetectors comprises a charge-coupled device.

7. The apparatus of claim 1, wherein the performance parameter is a line width displayed by the display screen and wherein the processor comprises:
means for determining a horizontal axis and vertical axis luminance profile from the stored intensity values; means for determining the horizontal line width as a function of the vertical axis luminance profile and means for determining the vertical line width as a function of the horizontal axis luminance profile.

8. The apparatus of claim 1, wherein the performance parameter is a spot size displayed by the display screen and wherein the processor comprises: means for determining a horizontal luminance profile from the stored intensity values; means for determining the spot width as a function of the horizontal luminance profile; means for determining a vertical luminance profile from the stored intensity values; and means for determining the spot height as a function of the vertical luminance profile; and means for determining the spot size as a function of the spot width and spot height.

9. The apparatus of claim 1, wherein the performance parameter is a spot shape displayed by the display screen and wherein the processor comprises: means for determining a luminance contour from the stored intensity values; and means for determining the spot shape as a function of the luminance contour and the calibrated spatial geometry.

10. The apparatus of claim 1, wherein the performance parameter is a spot profile displayed by the display screen and wherein the processor comprises: means for determining a luminance contour from the stored intensity values; and means for determining the spot profile as a function of the luminance contour and the calibrated spatial geometry.

11. The apparatus of claim 1, wherein the processor comprises means for detecting rotational error between the photodetector array and the display screen, said means for detecting rotational error comprising:
the processor being adapted for identifying when the row of photodetectors no longer corresponds to the centroids of the adjacent illuminated pixels of the pixel row.

12. The apparatus of claim 11, wherein the processor comprises means for correcting rotational error of less than ten degrees between the photodetector array and the display screen as function of the stored spatial geometry of the photodetector array.

13. A method of measuring performance of an image displayed on a display screen having a known pixel geometry and pitch, comprising the steps of:
superimposing a two dimensional array of photodetectors having a known spatial geometry on the display screen;
storing the known pixel geometry and pitch of the display screen, the known spatial geometry of the photodetectors, and intensity values generated by the photodetectors in response to incident light from the pixels; and
calibrating the apparatus to measure distances in terms of the stored spatial geometry as a function of the stored pixel geometry and pitch, and the stored intensity values, responsive to said storing step;
wherein said step of calibrating comprising the steps of:
the photodetectors detecting one of a red, green, or blue color test pattern generated by the display screen:
digitizing and storing the intensity values associated with the color test pattern:
determining a row of centroid photodetectors which corresponds to centroids of adjacent illuminated pixels along a pixel row of the display screen, and determining an actual distance between the illuminated pixels from the stored pixel geometry;

calibrating the apparatus for measuring distances in terms of the photodetectors' stored spatial geometry as a function of the actual distance and a number of photodetectors between two centroid photodetectors.

14. The method of claim 13, further comprising the steps of:

determining a performance parameter of the display screen as a function of the stored intensity values and a calibrated spatial geometry of the apparatus, responsive to said calibrating step.

15. The method of claim 14 wherein the display screen is a color display screen, the method further comprising the steps of:

generating a map, in terms of the photodetectors' spatial geometry, of predicted positions of the pixels not generated by the test pattern of the color display screen as a function of the stored pixel geometry and pitch and the stored intensity values; and, storing a map of pixel positions and colors including the predicted positions of the pixels, responsive to said generating step.

16. The method of claim 15, further comprising:

determining the performance parameter of the display screen as a function of the photodetectors' mapped spatial geometry, responsive to said step of generating a map.

17. The method of claim 16, wherein the performance parameter is convergence of a color display screen, further comprising the steps of:

the processor being adapted for measuring and storing a vertical convergence by comparing vertical axis centroids of each color component of the test pattern which is in a form of a white horizontal line with the map of the predicted positions of the pixels; and the processor being further adapted for measuring and storing a horizontal convergence by comparing horizontal axis centroids of each color component of the test pattern which is in a form of a white vertical line with the map of the predicted positions of the pixels.

18. The method of claim 14, wherein the performance parameter is an inner contrast ratio of characters displayed by the display screen, comprising the steps of:

determining a horizontal and vertical luminance profile from the intensity values; determining the vertical contrast ratio as a function of the vertical luminance profile; and determining the horizontal contrast ratio as a function of the horizontal luminance profile.

19. The method of claim 14, wherein the array of photodetectors comprises a charge-coupled device.

20. The method of claim 14, wherein the performance parameter is a line width displayed by the display screen, comprising the steps of:

determining a horizontal axis luminance profile and a vertical axis luminance profile from the stored intensity values;

determining a horizontal line width as a function of the vertical axis luminance profile; and determining a vertical line width as a function of the horizontal axis luminance profile.

21. The method of claim 14, wherein the performance parameter is a spot size displayed by the display screen, comprising the steps of:

determining a horizontal luminance profile from the stored intensity values; determining a spot width as a function of the horizontal luminance profile; determining a vertical luminance profile from the stored intensity values; determining a spot height as a function of the vertical luminance profile; and determining the spot size as a function of the spot width and spot height.

22. The method of claim 14, wherein the performance parameter is a spot shape displayed by the display screen, comprising the step of determining a luminance contour from the stored intensity values; and means for determining the spot shape as a function of the luminance contour.

23. The method of claim 14, wherein the performance parameter is a spot profile displayed by the display screen, comprising the steps of:

determining a luminance contour from the stored intensity values; and, determining the spot profile as a function of the luminance contour and the photodetectors' mapped spatial geometry.

24. The method of claim 15, for detecting rotational error between the photodetector array and the display screen comprising the step of:

identifying when the row of centroid photodetectors no longer corresponds to the centroids of the adjacent illuminated pixels of the pixel row.

25. The method of claim 15, further comprising the step of correcting rotational error of less than ten degrees between the photodetector array and the display screen as a function of the known spatial geometry of the photodetectors.

* * * * *